(12) United States Patent
Ito et al.

(10) Patent No.: US 7,518,849 B2
(45) Date of Patent: Apr. 14, 2009

(54) MULTILAYER ELECTRONIC DEVICE AND THE PRODUCTION METHOD

(75) Inventors: Kazushige Ito, Yokohama (JP); Kouji Tanaka, Nikaho (JP); Makoto Takahashi, Nikaho (JP); Akitoshi Yoshii, Nikaho (JP); Masayuki Okabe, Nikaho (JP)

(73) Assignee: TDK Corporation, Tokyo (JP)

( * ) Notice: Subject to any disclaimer, the term of this patent is extended or adjusted under 35 U.S.C. 154(b) by 194 days.

(21) Appl. No.: 11/727,868

(22) Filed: Mar. 28, 2007

(65) Prior Publication Data

US 2007/0236862 A1    Oct. 11, 2007

(30) Foreign Application Priority Data

Mar. 31, 2006    (JP)    ............... 2006-096781

(51) Int. Cl.
    *H01G 4/06*    (2006.01)
(52) U.S. Cl. .............. 361/321.2; 361/301.4; 361/306.1; 361/311; 361/312
(58) Field of Classification Search .............. 361/321.2, 361/321.1, 303–305, 311–313, 306.1, 306.3, 361/301.4
    See application file for complete search history.

(56) References Cited

U.S. PATENT DOCUMENTS

| | | | |
|---|---|---|---|
| 6,198,618 B1 * | 3/2001 | Ohtani et al. | 361/306.3 |
| 6,621,682 B1 * | 9/2003 | Takakuwa et al. | 361/306.3 |
| 6,785,121 B2 * | 8/2004 | Nakano et al. | 361/321.2 |
| 6,819,543 B2 * | 11/2004 | Vieweg et al. | 361/306.3 |
| 6,826,031 B2 * | 11/2004 | Nagai et al. | 361/305 |
| 6,922,329 B2 * | 7/2005 | Togashi | 361/309 |
| 6,969,647 B2 * | 11/2005 | Devoe et al. | 438/244 |

FOREIGN PATENT DOCUMENTS

| | | |
|---|---|---|
| JP | A 05-190373 | 7/1993 |
| JP | A 07-201222 | 8/1995 |
| JP | A 2004-311985 | 11/2004 |
| JP | A 2005-129591 | 5/2005 |

\* cited by examiner

*Primary Examiner*—Nguyen T Ha
(74) *Attorney, Agent, or Firm*—Oliff & Berridge, PLC

(57) ABSTRACT

A production method of a multilayer electronic device having an element body configured by alternately stacked dielectric layers formed by using dielectric paste and internal electrode layers formed by using conductive paste: wherein an adding quantity of a co-material included in conductive paste for forming internal electrode layers at the outermost positions in the stacking direction is larger than an adding quantity of a co-material included in conductive paste for forming internal electrode layers at the center position in the stacking direction when adding conductive particles and co-material particles to the conductive paste.

20 Claims, 4 Drawing Sheets

MULTILAYER ELECTRONIC DEVICE AND THE PRODUCTION METHOD

BACKGROUND OF THE INVENTION

1. Field of the Invention

The present invention relates to a multilayer electronic device having excellent humidity resistance and a low volume change rate against temperature changes, wherein electrodes hardly break particularly in the outermost internal electrode layer in the stacking direction, and the production method.

2. Description of the Related Art

In recent years, along with downsizing and increasing capacitance of a capacity, there have been demands for a method of stacking thinner dielectric layers and internal electrode layers with less defects for multilayer ceramic capacitors.

To satisfy such demands, an increase of the number of dielectric layers and internal electrode layers and realization of thinner layers in a multilayer ceramic capacitor have been pursued. However, when a base metal Ni is used as the internal electrodes, a shrinkage difference arises between Ni and dielectric particles composing the dielectric layers because Ni has a lower melting point comparing with dielectrics and the difference of sintering temperatures is large. Consequently, it results in arising delamination and cracks, declining capacitance and rising a defective rate.

To overcome the disadvantages, there has been used a method of adding as co-material particles dielectric particles having the same composition as that of the dielectric layers to the electrode paste (refer to the Japanese Unexamined Patent Publication No. 2005-129591, the Japanese Unexamined Patent Publication No. 2004-311985, the Japanese Unexamined Patent Publication No. H07-201222 and the Japanese Unexamined Patent Publication No. H05-190373). As a result that the co-material particles are included with Ni particles in the electrode paste, spheroidizing due to grain growth of Ni can be suppressed to some extent. Particularly, the Japanese Unexamined Patent Publication No. 2005-129591 discloses a method of adding a co-material in an amount of 2 to 20 wt % for suppressing delamination and cracks between internal electrode layers and dielectric layers.

However, in a multilayer electronic device obtained by the Japanese Unexamined Patent Publication No. 2005-129591, electrode breaking could easily occur on an electrode surface of an outermost electrode layer in the stacking direction among the stacked electrode layers and crush or destruction could be caused due to intrusion of moisture from the broken part under a highly humid condition.

Therefore, a method of increasing an adding quantity of the co-material particles may be considered. However, when the adding quantity of co-material particles is increased, a change of capacitance against temperature changes becomes large and the temperature characteristics could be deteriorated.

SUMMARY OF THE INVENTION

An object of the present invention is to provide a multilayer electronic device having high humidity resistance and excellent temperature characteristics, wherein an electrode coverage rate of the outermost internal electrode layer in the stacking direction is improved and crush or destruction is not caused from an electrode broken part of the outermost internal electrode layer even under a highly humid condition, and the production method.

To attain the above object, according to the present invention, there is provided a production method of a multilayer electronic device configured that dielectric layers formed by using dielectric paste and internal electrode layers formed by using conductive paste are alternately stacked:

wherein when adding conductive particles and co-material particles to the conductive paste, an adding quantity of the co-material included in the conductive paste for forming the internal electrode layers at the outermost positions in the stacking direction is larger than an adding quantity of the co-material included in the conductive paste for forming the internal electrode layers positioned at the center in the stacking direction.

The present inventors have found that humidity resistance can become high (for example, being bearable under a highly humid condition for 1500 hours or longer) without affecting required temperature characteristics (for example, the X8R characteristics) by making an adding quantity of a co-material larger in electrode layers at the outermost positions than that in center layers.

Namely, according to the present invention, a multilayer electronic device, such as a multilayer ceramic capacitor, having a high electrode coverage rate of the outermost internal electrode layer (hereinafter, also referred to as "an outermost layer electrode coverage rate"), consequently, high humidity resistance and excellent temperature characteristics can be obtained.

Preferably, an adding quantity of the co-material included in the conductive paste for forming each of internal electrode layers gradually increases from the internal electrode layers positioned at the center in the stacking direction to the internal electrode layers positioned at the outermost positions in the stacking direction. By gradually increasing an adding quantity of the co-material included in conductive paste, delamination and cracks can be effectively suppressed comparing with the case of abruptly increasing the same.

Preferably, a step of furthermore stacking pre-multilayer body units formed by stacking a plurality of internal electrode layers and the dielectric layers is included:

wherein an adding quantity of the co-material included in conductive paste for forming the internal electrode layers included in the pre-multilayer body units at the outermost positions in the stacking direction is larger than an adding quantity of the co-material included in conductive paste for forming the internal electrode layers included in the pre-multilayer body units positioned at the center in the stacking direction.

By forming a plurality of internal electrode layers positioned inside of a pre-multilayer body unit from the same conductive paste, the number of steps can be reduced.

Preferably, an adding quantity of the co-material included in the conductive paste for forming the internal electrode layers gradually increases by each of pre-multilayer body units from the pre-multilayer body units positioned at the center in the stacking direction to the pre-multilayer body unit at the outermost positions in the stacking direction.

By forming a plurality of internal electrode layers positioned inside of a pre-multilayer body unit from the same conductive paste, the number of steps can be reduced in this case.

Preferably, an adding quantity of the co-material included in the conductive paste for forming the internal electrode layers at the outermost positions in the stacking direction is larger than 30 wt % and smaller than 65 wt % with respect to 100 parts by weight of the conductive particles.

Preferably, when assuming that the total number of stacking layers of the internal electrode layers is N, adding quantities of the co-material included in the conductive paste for forming all of the internal electrode layers within the range of (1 to 0.2×N) layers from the outermost internal electrode layer in the stacking direction are larger than 30 wt % and smaller than 65 wt % with respect to 100 parts by weight of the conductive particles.

By setting an adding quantity of the co-material included in the conductive paste for forming all of adjacent internal electrode layers at (1 to 0.2×N) layer as well as internal electrode layers at the outermost positions in the stacking direction within the above range, the humidity resistance and the temperature characteristics can be improved.

Preferably, when assuming that a particle diameter of conductive particles included in conductive paste for forming the internal electrode layers at the outermost positions in the stacking direction is α and a particle diameter of co-material particles is β, α/β is 0.8 to 8.0. By setting to be in this range, the outermost layer electrode coverage rate can be furthermore improved and the humidity resistance can be also improved.

Preferably, an adding quantity of the co-material included in conductive paste for forming the internal electrode layers at the center position in the stacking direction is 10 to 25 wt % with respect to 100 parts by weight of conductive particles. By setting to be in this range, the temperature characteristics can be furthermore improved.

Preferably, exterior dielectric layers are stacked outside of the internal electrode layers at the outermost positions in the stacking direction. By providing the exterior dielectric layers, interior dielectric layers, wherein a large number of internal electrode layers are stacked, can be protected effectively.

A multilayer electronic device according to the present invention is not particularly limited and multilayer ceramic capacitors, piezoelectric elements, chip inductors, chip varisters, chip thermisters, chip resistors and other surface mounted (SMD) chip type electronic devices may be mentioned.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

In the present embodiment, a multilayer ceramic capacitor 1 shown in FIG. 1 will be taken as an example of a multilayer electronic device, and the configuration and production method will be explained.

Figure 1:
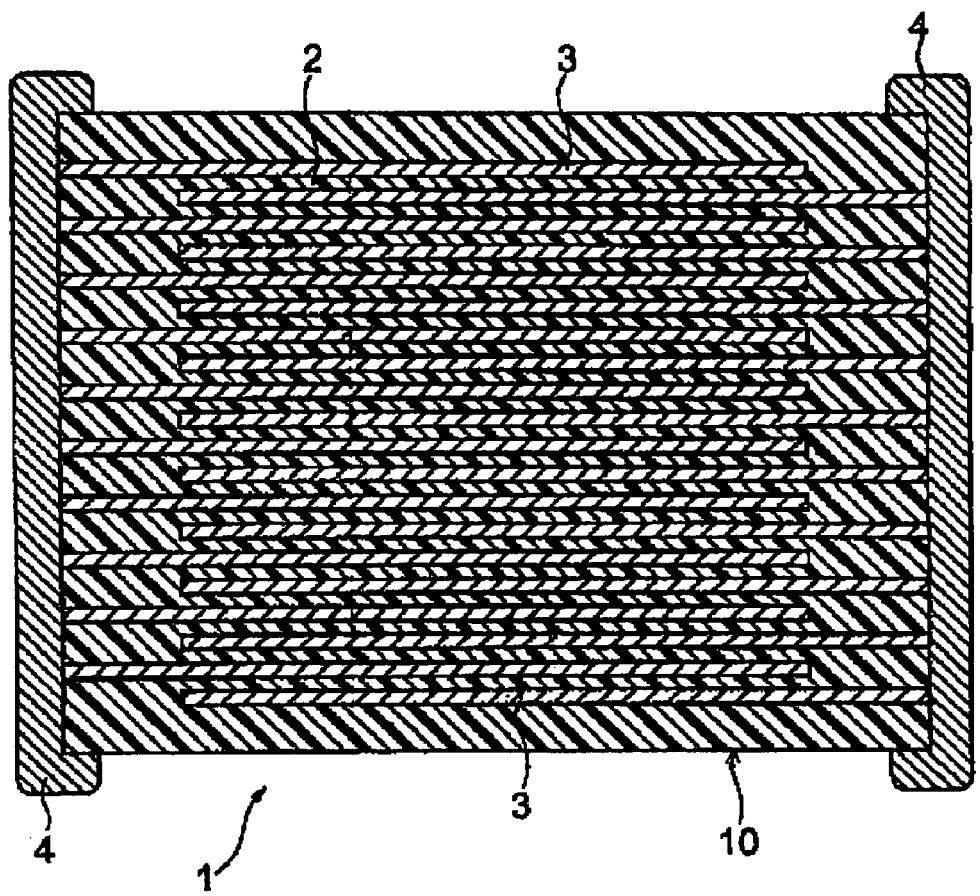
FIG. 1 is a sectional view of a multilayer ceramic capacitor according to an embodiment of the present invention.

As shown in FIG. 1, the multilayer ceramic capacitor 1 as a multilayer electronic device according to an embodiment of the present invention has a capacitor element body 10, wherein dielectric layers 2 and internal electrode layers 3 are alternately stacked. On both end portions of the capacitor element body 10, a pair of external electrodes 4 is formed to respectively conduct to the internal electrode layers 3 alternately arranged inside the element body 10. The internal electrode layers 3 are stacked so that the end surfaces are alternately exposed to facing surfaces of the two end portions of the capacitor element body 10.

The pair of external electrodes 4 are formed on both end portions of the capacitor element body 10 and connected to exposed end surfaces of the alternately arranged internal electrode layers 3 so as to configure a capacitor circuit. The shape of the capacitor element body 10 is not particularly limited, but it is normally a rectangular parallelepiped shape. Also, the size is not particularly limited and may be a suitable size in accordance with application, but is normally (0.6 to 5.6 mm)× (0.3 to 5.0 mm)×(0.3 to 1.9 mm) or so. The dielectric layers 2 are not particularly limited and composed, for example, of a dielectric ceramic composition satisfying the X8R characteristics of the EIA standard explained below. Note that the X8R characteristics indicate a characteristic of a capacitance change rate ΔC/C=within ±15% at −55 to 150° C.

A dielectric material according to the present embodiment includes a dielectric oxide expressed by a composition formula of $(Ba_{1-x}Ca_x)_m(Ti_{1-y}Zr_y)O_3$. At this time, an oxygen (O) amount may be a little deviated from the above stoichiometric composition.

In the above formula, "x" is preferably $0 \leq x \leq 0.15$, and more preferably, $0.02 \leq x \leq 0.10$. The "x" indicates the number of Ca atoms, and a phase transition point of the crystal can be freely shifted by changing the "x", that is, a Ca/Ba ratio. Therefore, a capacity-temperature coefficient and specific permittivity can be freely controlled.

In the above formula, "y" is preferably $0 \leq y \leq 1.00$, and more preferably $0.05 \leq y \leq 0.80$. The "y" indicates the number of Ti atoms, and there is a tendency that the reduction resistance becomes furthermore higher by replacing $TiO_2$ by $ZrO_2$ which is harder to be reduced comparing with $TiO_2$. Note that, in the present invention, a ratio of Zr and Ti may be any and only one of the two may be included.

In the above formula, the "m" is preferably $0.995 \leq m \leq 1.020$, and more preferably, $1.000 \leq m \leq 1.006$. By setting the "m" to 0.995 or larger, formation of semiconductor can be prevented when fired in a reducing atmosphere. By setting the "m" to 1.020 or smaller, a fine sintering body can be obtained without heightening the firing temperature.

The dielectric layers 2 include first to fourth subcomponent below in addition to the above main component: a first subcomponent including at least one kind selected from MgO, CaO, BaO and SrO, a second subcomponent including a silicon oxide as its main component, a third subcomponent including at least one kind selected from $V_2O_5$, $MoO_3$ and $WO_3$, and a fourth subcomponent including an oxide of R (note that R is at least one kind selected from Sc, Y, La, Ce, Pr, Nd, Pm, Sm, Eu, Gd, Tb, Dy, Ho, Er, Tm, Yb and Lu) are included.

Ratios of the respective subcomponents with respect to 100 moles of the main component are first subcomponent: 0.1 to 5 moles,
second subcomponent: 1 to 10 moles,
third subcomponent: 0.01 to 0.2 mole, and
fourth subcomponent: 0.1 to 12 moles; and more preferably, first subcomponent: 0.2 to 2.0 moles,
second subcomponent: 2 to 5 moles,
third subcomponent: 0.05 to 0.1 mole, and
fourth subcomponent: 0.2 to 8 moles.

Note that the ratio of the fourth subcomponent is not a mole ratio of an oxide of R but a mole ratio of an R element alone. Namely, for example, when using an oxide of Y as the fourth subcomponent (an oxide of R), a ratio of the fourth subcomponent being 1 mole means a ratio of the Y element being 1 mole, and not a ratio of $Y_2O_3$ being 1 mole.

As a result that the first to fourth subcomponents are included in addition to the main component having the above predetermined composition, the capacity-temperature characteristic can be improved while maintaining high permittivity, and particularly, the X8R characteristics of the EIA standard can be satisfied. Preferable contents of the first to fourth subcomponents are as above and the reasons are as below.

The first subcomponent (MgO, CaO, BaO and SrO) exhibits an effect of flattening the capacity-temperature characteristic. When a content of the first subcomponent is too small, a temperature change rate of the capacitance may become large. On the other hand, when the content is too much, the sinterability may decline. Note that component ratios of respective oxides in the first subcomponent may be any.

The second subcomponent includes a silicon oxide as its main component, which is preferably at least one kind selected from $SiO_2$, MO (note that M is at least one kind selected from Ba, Ca, Sr and Mg), $Li_2O$ and $B_2O_3$. The second subcomponent mainly acts as a sintering aid and has an effect of improving a defective rate of initial insulation resistance when layers are made thin. When a content of the second subcomponent is too small, the capacity-temperature characteristic declines and the IR (insulation resistance) declines. On the other hand, when the content is too large, the IR lifetime becomes insufficient and the specific permittivity abruptly declines.

Note that, in the present embodiment, a compound expressed by $(Ba, Ca)_xSiO_{2+x}$ (note that x=0.7 to 1.2) may be used as the second subcomponent. The first subcomponent also includes BaO and CaO in the $[(Ba, Ca)_xSiO_{2+x}]$, and since $(Ba, Ca)_xSiO_{2+x}$ as a composite oxide has a low melting point, it has preferable reactivity with the main component. Therefore, BaO and/or CaO can be also added as the composite oxide. Note that a ratio of Ba and Ca may be any and only one of the two may be included.

The third subcomponent ($V_2O_5$, $MoO_3$ and $WO_3$) exhibits an effect of flattening a capacity-temperature characteristic at the Curie's temperature or higher and an effect of improving the IR lifetime. When a content of the third subcomponent is too small, the effects become insufficient. On the other hand, when the content is too large, the IR declines remarkably. Note that component ratios of respective oxides in the third subcomponent may be any.

The fourth subcomponent (an oxide of R) has an effect of shifting the Curie's temperature to the high temperature side and an effect of flattening the capacity-temperature characteristic. When a content of the fourth subcomponent is too small, the effects become insufficient and the capacity-temperature characteristic declines. On the other hand, when the content is too large, the sinterability tends to decline. In the present embodiment, Y, Dy, Ho, Er, Tm and Yb are preferable among the R elements because the effect of improving the characteristics is high.

Preferably, the dielectric layers 2 furthermore include a fifth subcomponent including MnO or $Cr_2O_3$, and a sixth subcomponent including $CaZrO_3$ or $CaO+ZrO_2$ in addition to the main component and the first to fourth subcomponents as above.

Ratios of the fifth subcomponent and the sixth subcomponent with respect to 100 moles of the main component are preferably,
  fifth subcomponent: 0.1 to 2.5 moles, and
  sixth subcomponent: 0 to 5 moles (note that 0 is not included), and more preferably,
  fifth subcomponent: 0.1 to 0.5 mole, and
  sixth subcomponent: 1.0 to 3.0 moles.

Note that the ratio of the fifth subcomponent is not a mole ratio of an oxide of Mn or an oxide of Cr, but is a mole ratio of a Mn element or Cr element alone.

The fifth-subcomponent (MnO or $Cr_2O_3$) exhibits an effect of accelerating sintering, an effect of heightening the IR and an effect of improving the IR lifetime. When a content of the fifth subcomponent is too small, the effects cannot be fully brought out. On the other hand, when the content is too large, it is liable that the capacity-temperature characteristic may be adversely affected.

The sixth subcomponent ($CaZrO_3$ or $CaO+ZrO_2$) exhibits an effect of shifting the Curie's temperature to the high temperature side and an effect of flattening the capacity-temperature characteristic. Also, it has an effect of improving the CR product and direct current insulation breakdown strength. Note that when a content of the sixth subcomponent is too large, the IR accelerated lifetime declines remarkably and the capacity-temperature characteristic (X8R characteristics) declines.

As other subcomponent, $Al_2O_3$, etc. may be mentioned.

An average crystal grain diameter of the dielectric material is not particularly limited and may be suitably determined, for example, in a range of 0.1 to 3 μm in accordance with a thickness of the dielectric layer, etc. The capacity-temperature characteristic tends to deteriorate as the dielectric layer becomes thinner and as the average crystal grain diameter becomes smaller. Therefore, the dielectric material of the present invention is particularly effective when the average crystal grain diameter has to be made smaller, specifically, when the average crystal grain diameter is 0.1 to 0.5 μm. Also, when the average crystal grain diameter becomes smaller, the IR lifetime becomes longer and a change of capacitance over time under a direct current electric field becomes smaller. Therefore, the average crystal grain diameter is preferably small as above also from this point.

The Curie's temperature (a phase transition temperature from ferroelectrics to paraelectrics) of a dielectric ceramic composition may be changed by selecting the composition, and to satisfy the X8R characteristics, it is preferably 120° C. or higher and, more preferably, 123° C. or higher. Note that the Curie's temperature can be measured by DSC (differential scanning calorimetry), etc.

A thickness of one dielectric layer composed of the dielectric ceramic composition is normally 40 μm or thinner and particularly 30 μm or thinner. The lower limit of the thickness is normally 2 μm or so. The dielectric ceramic composition of the present embodiment is effective to improve a capacity-temperature characteristic of a multilayer ceramic capacitor having such a thin dielectric layer. Note that the number of stacked dielectric layers is normally 2 to 300 or so.

A multilayer ceramic capacitor using the dielectric ceramic composition is suitable when used as an electronic device for an apparatus used under an environment of 80° C. or higher, particularly, 125 to 150° C. In such a temperature range, the temperature characteristic of capacitance satisfies the R characteristic of the EIA standard and, furthermore, satisfies the X8R characteristics.

A metal to be included in the internal electrode layers 3 is not particularly limited, but since the component of the dielectric layers 2 has reduction resistance, base metals may be used. As base metals, Ni or a Ni alloy is preferable. As a Ni alloy, alloys of one or more kinds of elements selected from Mn, Cr, Co and Al with Ni are preferable, and a Ni content in the alloy is preferably 95 wt % or larger. Note that Ni or a Ni alloy may include a variety of trace components, such as P, in an amount of not larger than 0.1 wt % or so. A thickness of the internal electrode layers may be suitably determined in accordance with application, etc., but normally it is 0.5 to 5 μm, and particularly 0.5 to 2.5 μm or so is preferable.

A base metal to be included in the external electrode 4 is not particularly limited and inexpensive Ni, Cu and alloys of these may be used. A thickness of the external electrode may be suitably determined in accordance with application, etc. but normally 10 to 50 μm or so is preferable.

A multilayer ceramic capacitor using a dielectric is produced by forming a green chip by a normal printing method or a sheet method using paste, firing the same, then, printing or transferring external electrodes and firing in the same way as in a multilayer ceramic capacitor of the related arts. Below, the production method will be explained specifically.

First, a dielectric powder included in dielectric layer paste is prepared and made to form slurry, so that dielectric layer paste is fabricated.

The dielectric layer paste may be organic based slurry obtained by kneading the dielectric ceramic composition powder and an organic vehicle, or water-based slurry.

As the dielectric material powder, the above oxides, mixture of them and composite oxides may be used, and furthermore, a variety of compounds to be the oxides and composite oxides when fired, such as carbonate, oxalate, nitrate, hydroxide and organic metal compound, etc., may be suitably selected and mixed for use. Contents of respective compounds in the dielectric material powder may be determined so as to attain a composition of the above dielectric after firing.

An average particle diameter of the dielectric material powder is normally 0.1 to 3 μm or so in a state before formed to be slurry.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone and toluene, in accordance with a method to be used, such as a printing method and sheet method.

When using water based slurry as dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and a water-soluble acrylic resin, etc. may be used.

Internal electrode paste includes conductive particles, co-material particles and an organic vehicle. As the conductive particles, for example, Ni and a Ni alloy are used and a Ni powder is preferably used. It is because the conductive particles are required to have a higher melting point than a sintering temperature of the dielectric powder included in the dielectric layers, not to react with the dielectric powder, not to be dispersed in the dielectric layer after firing and not to be costly, etc. The co-material particles are not particularly limited as far as it is a ceramic powder, but a $BaTiO_3$ powder is preferably used.

An average particle diameter of the conductive particles to be used in the internal electrode paste is 0.3 to 0.5 μm. When assuming that an average particle diameter of the conductive particles is a and that of the co-material particles is A, those satisfying $\alpha/\beta$ of 0.8 to 8.0, preferably, 1.0 to 5.0 are used as the $BaTiO_3$ particles as the co-material particles. The internal electrode paste is fabricated by kneading the conductive particles, co-material particles and an organic vehicle. As the organic vehicle, those used for the dielectric layer paste may be used.

Figure 2:
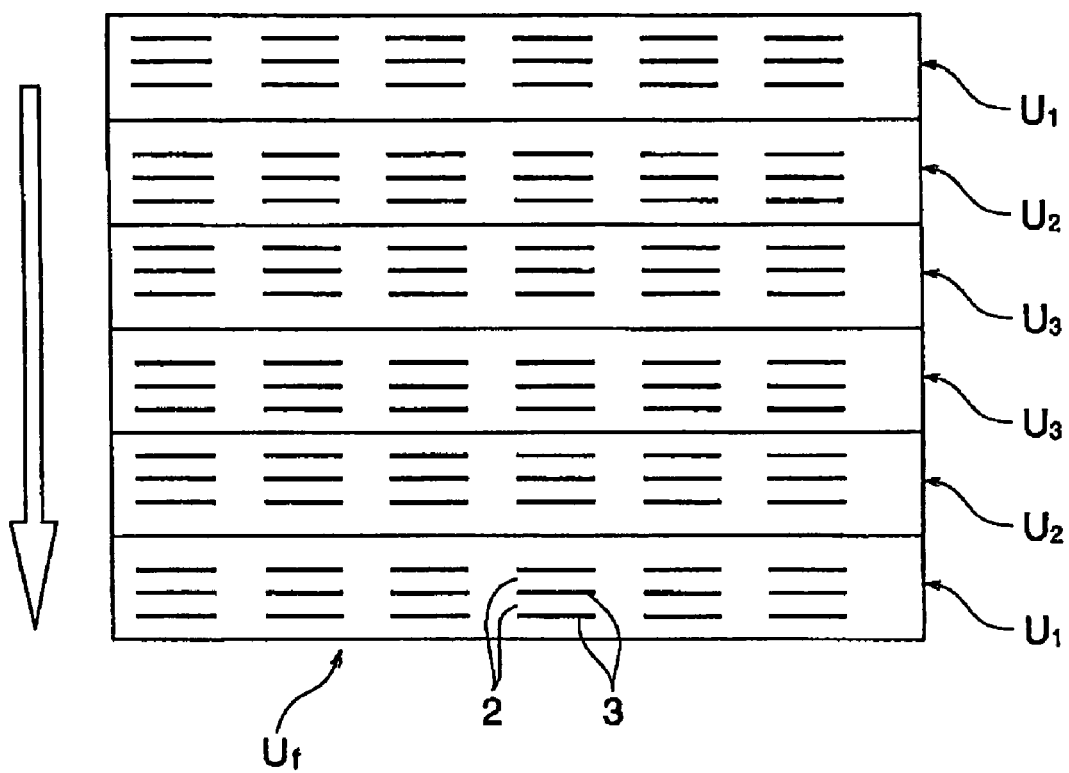
FIG. 2 is a schematic view of a multilayer body used in a procedure of producing the multilayer ceramic capacitor shown in FIG. 1.

In the present embodiment, a plurality of kinds of internal electrode paste is produced by changing the co-material quantity. For example, as shown in FIG. 2, a co-material particles in an amount of 30 to 65 wt % (note that 30 wt % and 65 wt % are not included) and preferably, larger than 40 wt % but not larger than 60 wt % with respect to 100 parts by weight of the conductive particles is added to internal electrode paste to be used for a pre-multilayer body unit $U_1$ positioned at the outermost layer in the stacking direction.

When assuming that the number of total stacked internal electrode layers in a final multilayer body $U_f$ is N, the pre-multilayer body unit $U_1$ at the outermost layer in the stacking direction has (1 to 0.2×N) of internal electrode layers from the outermost internal electrode layer 3 in the stacking direction.

Also, the internal electrode layer paste used for a pre-multilayer body unit $U_2$ positioned inside of the pre-multilayer body unit $U_1$ in the stacking direction includes a co-material in a smaller adding quantity than that included in the internal electrode paste of the pre-multilayer body unit $U_1$. Furthermore, internal electrode paste to be used for a pre-multilayer body unit $U_3$ positioned inside of the pre-multilayer body unit $U_2$ and at the center includes the co-material in a smaller adding quantity than that included in the internal electrode paste of the pre-multilayer body unit $U_2$.

The internal electrode paste to be used for the pre-multilayer body unit $U_3$ positioned at the center preferably includes the co-material in an adding quantity of 10 to 25 wt % with respect to 100 parts by weight of the conductive particles. Namely, the quantity of a co-material added to the conductive paste for forming internal electrode layers 3 included in the pre-multilayer body unit $U_1$ positioned at the outermost position in the stacking direction is larger comparing with that of the co-material added to the conductive paste for forming internal electrode layers 3 included in the pre-multilayer body unit $U_3$ positioned at the center in the stacking direction. The internal electrode layer paste is fabricated by kneading the conductive particles, co-material particles and an organic vehicle. As the organic vehicle, those used in the dielectric layer paste may be used.

External electrode paste may be fabricated in the same way as the above internal electrode layer paste explained above.

A content of the organic vehicle in each paste explained above is not particularly limited and may be a normal content, for example, the binder may be 1 to 5 wt % or so and the solvent may be 10 to 50 wt % or so. Also, additives selected from a variety of dispersants, plasticizers, dielectrics and insulators, etc. may be included in each paste in accordance with need. A total content thereof is preferably 10 wt % or smaller.

When using the printing method, the dielectric layer paste and the internal electrode layer paste are stacked by printing on a support film such as PET to obtain a pre-multilayer body unit. Pre-multilayer body units are identified as $U_1$, $U_2$ and $U_3$ in an order from the larger adding quantity of the co-material.

Next, the pre-multilayer body units are stacked in an order of $U_1$, $U_2$, $U_3$, $U_3$, $U_2$ and $U_1$ from the bottom as shown in FIG. 2 so that the multilayer body units $U_1$ and $U_3$ are positioned at the outermost layers and the center layers respectively. After that, relatively thick exterior dielectric layers, on which internal electrode layers are not printed, are stacked outside of the outermost pre-multilayer body units $U_1$ and bonded with pressure, so that the final multilayer body $U_f$ is obtained. The final multilayer body $U_f$ is cut into a predetermined shape to obtain a green chip.

When using the sheet method, the dielectric layer paste is used to form a green sheet, the internal electrode layer paste is printed thereon, and the results are stacked to obtain the pre-multilayer body units $U_1$, $U_2$ and $U_3$. Next, the pre-multilayer body units are stacked in an order of $U_1$, $U_2$, $U_3$, $U_3$, $U_2$ and $U_1$ from the bottom as shown in FIG. 2, and bonded with pressure, so that the final multilayer body $U_f$ is obtained in the same way as the method explained in the case of using the printing method. After that, the final multilayer body $U_f$ is cut into a predetermined shape to obtain a green chip.

Before firing, binder removal processing is performed on the green chip. The binder removal processing may be suitably determined in accordance with a kind of a conductive material in the internal electrode layer paste, but when using Ni, a Ni alloy or other base metal as the conductive material, an oxygen partial pressure in the binder removal atmosphere is preferably $10^{-45}$ to $10^5$ Pa. When the oxygen partial pressure is lower than the above range, the binder removal effect tends to decline, while when exceeding the range, the internal electrode layers tend to be oxidized.

As other binder removal condition, the temperature raising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours, and more preferably 2 to 20 hours. The firing atmosphere is preferably in the air or a reducing atmosphere. As an atmosphere gas in the reducing atmosphere, for example, a wet mixed gas of $N_2$ and $H_2$ is preferably used.

An atmosphere at firing the green chip may be suitably determined in accordance with a kind of a conductive material in the internal electrode layer paste, but when using a base metal, such as Ni or a Ni alloy, as the conductive material, an oxygen partial pressure in the firing atmosphere is preferably $10^{-7}$ to $10^{-3}$ Pa. When the oxygen partial pressure is lower than the above range, the conductive material in the internal electrode layer results in abnormal sintering to be broken in some cases. On the other hand, when the oxygen partial pressure exceeds the above range, the internal electrode layers tend to be oxidized.

Also, the holding temperature at firing is preferably 1100 to 1400° C., more preferably 1200 to 1380° C., and furthermore preferably 1260 to 1360° C. When the holding temperature is lower than the above range, densification becomes insufficient, while when exceeding the above range, breakings of electrodes due to abnormal sintering of the internal electrode layer, deterioration of capacity-temperature characteristic-due to dispersion of the internal electrode layer component; and reduction of the dielectric ceramic composition are easily caused.

As other firing condition, the temperature raising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. The firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layers and the IR lifetime is remarkably elongated thereby, so that the reliability is improved.

An oxygen partial pressure in the annealing atmosphere is preferably 0.1 Pa or higher, and particularly preferably 0.1 to 10 Pa. When the oxygen partial pressure is lower than the above range, re-oxidization of the dielectric layers becomes difficult, while when exceeding the above range, the internal electrode layers tend to be oxidized.

The holding temperature at annealing is preferably 1100° C. or lower, and particularly preferably 500 to 1100° C. When the holding temperature is lower than the above range, oxidization of the dielectric layers becomes insufficient, so that the IR becomes low and the IR lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristic, a decline of the IR and a decline of the IR lifetime are easily caused. Note that annealing may be composed only of a temperature raising step and a temperature lowering step. Namely, the temperature holding time may be zero. In that case, the holding temperature is synonym of the highest temperature.

As other annealing condition, the temperature holding time is preferably 0 to 20 hours and more preferably 2 to 10 hours, and the cooling rate is preferably 50 to 500° C./hour and more preferably 100 to 300° C./hour. Also, a preferable atmosphere gas at annealing is, for example, a wet $N_2$ gas, etc.

In the above binder removal processing, firing and annealing, for example, a wetter, etc. may be used to wet the $N_2$ gas and mixed gas, etc. In that case, the water temperature is preferably 5 to 75° C. or so.

The binder removal processing, firing and annealing may be performed continuously or separately. When performing continuously, the atmosphere is changed without cooling after the binder removal processing, and continuously, the temperature is raised to the holding temperature at firing to perform firing. Next, it is cooled and annealing is preferably performed by changing the atmosphere when the temperature reaches to the holding temperature of the annealing. On the other hand, when performing them separately, at the time of firing, after raising the temperature to the holding temperature of the binder removal processing in an atmosphere of a $N_2$ gas or a wet $N_2$ gas, the atmosphere is changed, and the temperature is preferably furthermore raised. Then, after cooling the temperature to the holding temperature of the annealing, it is preferable that the cooling continues by changing the atmosphere again to a $N_2$ gas or a wet $N_2$ gas. Also, in the annealing, after raising the temperature to the holding temperature under the $N_2$ gas atmosphere, the atmosphere may be changed, or the entire process of the annealing may be in a wet $N_2$ gas atmosphere.

End surface polishing, for example, by barrel polishing or sand blast, etc. is performed on the capacitor element body obtained as above, and the external electrode paste is printed or transferred and fired to form external electrodes 4. Firing condition of the external electrode paste is preferably, for example, in a wet mixed gas of $N_2$ and $H_2$ at 600 to 800° C. for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

Such an electronic device that includes a dielectric layer composed of a dielectric ceramic composition having the above composition as well as multilayer ceramic capacitor is mounted on a print substrate, etc. by soldering, etc. and used for a variety of electronic apparatuses, etc.

In the production method of a multilayer ceramic capacitor according to the present embodiment, it was found that the humidity resistance can be improved (for example, being bearable to a highly humid condition for 1500 hours or longer) without affecting required temperature characteristics (for example, the X8R characteristics) by setting a co-material adding quantity of electrode layers in the pre-multilayer body unit $U_1$ positioned at the outermost layer than that in the pre-multilayer body unit $U_3$ positioned at the center.

Namely, according to the present embodiment, it is possible to obtain a multilayer ceramic capacitor having a high electrode coverage rate of the outermost internal electrode layer (hereinafter, also referred to as "an outermost layer electrode coverage rate") resulting in high humidity resistance and excellent temperature characteristics.

Further, in the present invention, the following modification may be possible as well.

Figure 3:
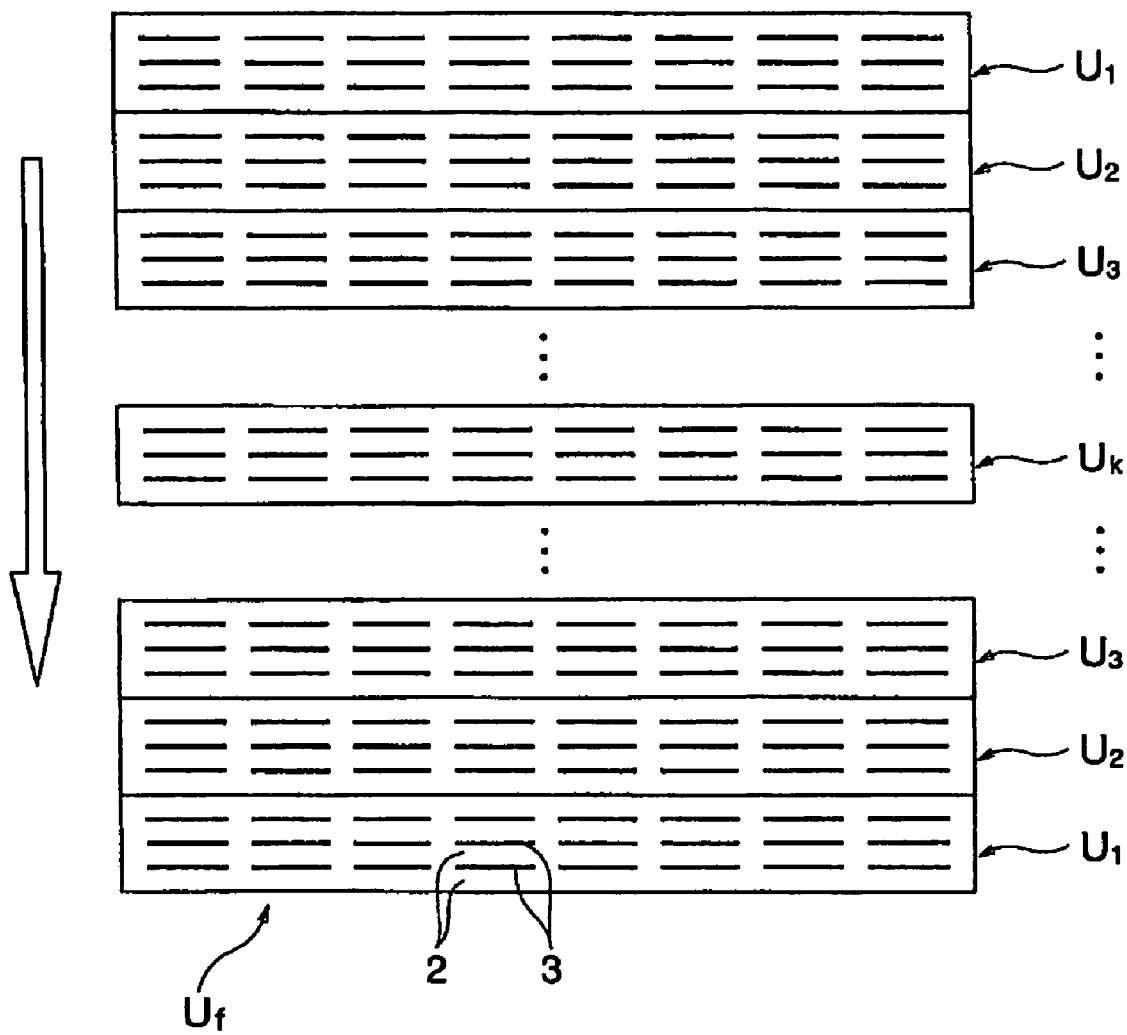
FIG. 3 is a schematic view of a multilayer body used in a procedure of producing a multilayer ceramic capacitor according to another embodiment of the present invention.

For example, as shown in FIG. 3, pre-multilayer body units $U_1$ to $U_k$ may be produced so that a relationship of the co-material adding quantities satisfies $U_1 \geq U_2 \geq U_3 \geq \ldots \geq U_k$ and $U_1 > U_k$. After that, as shown in FIG. 3, the pre-multilayer body units $U_1$ to $U_k$ are stacked to form the final multilayer body $U_f$. Steps after that are the same as those explained in the above embodiment, and the same effects can be obtained.

In the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

Furthermore, as shown in FIG. 2 and FIG. 3, the method of the present invention is not limited to a method of forming a final multilayer body $U_f$ by stacking respective pre-multilayer body units, and it may be applied to a method of forming the final multilayer body $U_f$ by stacking green sheets on each of which an internal electrode layer is printed. Alternately, the method of the present invention may be applied to a method of forming the final multilayer body $U_f$ by stacking internal electrode layers and dielectric layers by the printing method.

Below, the present invention will be explained based on furthermore detailed examples, but the present invention is not limited to the examples.

As shown in FIG. 2, after stacking the pre-multilayer body units in an order of $U_1$, $U_2$, $U_3$, $U_3$, $U_2$ and $U_1$, firing was performed. Then, an outermost layer electrode coverage rate was measured and a temperature characteristics test and humidity resistance test were conducted on the thus obtained multilayer ceramic capacitors.

Formation of Pre-Multilayer Body Unit $U_1$

EXAMPLE 1

First, as starting materials for producing a dielectric ceramic composition, a main component material ($BaTiO_3$) and subcomponent materials were prepared. In the present example, $BaTiO_3$ having an average particle diameter of 0.30 µm was used as the main component material.

As the subcomponent materials, the following materials were used. Carbonates (the first subcomponent: $MgCO_3$, the fifth subcomponent: $MnCO_3$) were used as materials of MgO and MnO, and oxides (the second subcomponent: $(Ba_{0.6}Ca_{0.4})SiO_3$, the third subcomponent: $V_2O_5$, the fourth subcomponent: $Yb_2O_3+Y_2O_3$, the sixth subcomponent: $CaZrO_3$ and other subcomponent: $Al_2O_3$) were used as other materials.

The second subcomponent $(Ba_{0.6}Ca_{0.4})SiO_3$ is produced by wet mixing $BaCO_3$, $CaCO_3$ and $SiO_2$ by a ball mill for 16 hours, drying, firing at 1150° C. in the air and, furthermore, performing wet pulverization by a ball mill for 100 hours. The fifth subcomponent $CaZrO_3$ is produced by wet mixing $CaCO_3$ and $ZrO_2$ by a ball mill for 16 hours, drying, firing at 1150° C. in the air and, furthermore, performing wet pulverization by a ball mill for 24 hours.

Note that, for the main component $BaTiO_3$, same characteristics were obtained by using what produced by respectively weighing $BaCO_3$ and $TiO_2$, wet mixing by using a ball mill for about 16 hours, drying, firing at 1100° C. in the air and performing wet pulverization by a ball mill for about 16 hours. Also, as the main component $BaTiO_3$, the same characteristics were obtained by using what produced by the hydrothermal synthesis method or oxalate method, etc.

These materials were compounded, so that a composition after firing becomes $MgCO_3$: 1 mole, $(Ba_{0.6}Ca_{0.4})SiO_3$: 3 moles, $V_2O_5$: 0.1 mole, $Yb_2O_3$: 1.75 moles, $Y_2O_3$: 2 moles, $MnCO_3$: 0.374 mole, $CaZrO_3$: 2.0 moles and $Al_2O_3$: 1 mole with respect to 100 moles of the main component $BaTiO_3$, wet mixed by a ball mill for 16 hours and dried to obtain a dielectric ceramic composition.

Next, the obtained dried dielectric ceramic composition in an amount of 100 parts by weight, an acrylic resin in an amount of 4.8 parts by weight, ethyl acetate in an amount of 100 parts by weight, mineral spirit in an amount of 6 parts by weight and toluene in an amount of 4 parts by weight were mixed by a ball mill to form paste, so that dielectric layer paste was obtained.

Next, with respect to 100 parts by weight of Ni particles having an average particle diameter of 0.4 µm, a $BaTiO_3$ powder (BT-01 of Sakai Chemical Industry Co., Ltd.) having an average particle diameter 0.1 µm in an amount of 40 parts by weight, an organic vehicle (obtained by dissolving ethyl cellulose in an amount of 8 parts by weight in butyl carbitol in an amount of 92 parts by weight) in an amount of 40 parts by weight and butyl carbitol in an amount of 10 parts by weight were kneaded by a triple-roll to form paste, and internal electrode layer paste, wherein an amount of the $BaTiO_3$ particles is 40 wt % with respect to Ni particles, was obtained.

Next, Cu particles having an average particle diameter of 0.5 µm in an amount of 100 parts by weight, an organic vehicle (obtained by dissolving ethyl cellulose in an amount of 8 parts by weight in butyl carbitol in an amount of 92 parts by weight) in an amount of 35 parts by weight and butyl carbitol in an amount of 7 parts by weight were kneaded to from paste, so that external electrode paste was obtained.

Next, the dielectric layer paste was used to form a green sheet having a thickness of 10 μm on a PET film, the internal electrode layer paste was printed thereon, then, the green sheet was removed from the PET film and stacked, so that a pre-multilayer body unit $U_1$ was formed. The number of stacked green sheets was 30 in each of the pre-multilayer body units $U_1$.

Formation of Pre-Multilayer Body Unit $U_2$

Other than changing an adding quantity of the $BaTiO_3$ powder as a co-material particles to 30 parts by weight with respect to 100 parts by weight of Ni particles as conductive particles when producing internal electrode paste, pre-multilayer body units $U_2$ were formed in the same way as in the case of the pre-multilayer body units $U_1$.

Formation of Pre-Multilayer Body Unit $U_3$

Other than changing an adding quantity of the $BaTiO_3$ powder as a co-material particles to 20 parts by weight with respect to 100 parts by weight of Ni particles as conductive particles when producing internal electrode paste, pre-multilayer body units $U_3$ were formed in the same way as in the case of the pre-multilayer body units $U_1$.

Formation of Green Chip

Next, the pre-multilayer body units $U_1$, $U_2$ and $U_3$ were stacked as shown in FIG. 2 and bonded with pressure, so that a final multilayer body $U_f$ was obtained. The multilayer body was cut into a predetermined chip size to obtain a green chip. The number of stacked pre-multilayer body units $U_1$, $U_2$ and $U_3$ each having an internal electrode was 6, and the total number of stacked layers was 180.

Next, binder removal processing, firing and annealing were performed, so that a multilayer ceramic fired body was obtained.

The binder removal processing was performed under a condition that the temperature raising rate was 15° C./hour, the holding temperature was 280° C., the holding time was 2 hours and the atmosphere was in the air.

The firing was performed under a condition that the temperature raising rate was 200° C./hour, the holding temperature was 1260 to 1340° C., the holding time was 2 hours, the cooling rate was 300° C./hour and the atmosphere was in a wet mixed gas of $N_2+H_2$ (oxygen partial pressure was $10^{-6}$ Pa).

The annealing was performed under a condition that the holding temperature was 1200° C., the temperature holding time was 2 hours, the cooling rate was 300° C./hour and the atmosphere was in a nitrogen atmosphere. Note that a wetter with a water temperature of 35° C. was used to wet the atmospheres in the binder removal processing and firing.

Next, after polishing end surfaces of the multilayer ceramic fired body by sand blast, the external electrode paste was transferred to the end surfaces and external electrodes were formed by firing at 800° C. in a wet $N_2+H_2$ atmosphere for 10 minutes, so that multilayer ceramic capacitor samples having the configuration shown in FIG. 1 were obtained.

A size of the obtained capacitor samples was 3.2 nm×1.6 mm×1.6 mm, a thickness of one dielectric layer was 7.0 μm, and a thickness of one internal electrode layer was 1.0 μm.

Temperature Characteristic Test

As to a capacity-temperature characteristic (Ta), capacitance was measured in a temperature range of −55 to 150° C. on the obtained samples. Capacitance was measured by using a digital LCR meter (4274A made by YHP) under a condition of a frequency of 1 kHz and an input signal level (measurement voltage) of 1 Vrms. A change rate (ΔC/C, the unit is %) of the capacitance under a temperature environment of 150° C., where the capacity-temperature characteristic becomes worst in this temperature range, was calculated and whether the X8R characteristics (−55 to 150° C. and ΔC/C=within ±15%) were satisfied or not was examined. Those satisfying the X8R characteristic were marked "o" and those not were marked "x". The results of the temperature characteristic test at 150° C. are shown in Table 1.

Measurement of Outermost Layer Coverage Rate

Figure 4:
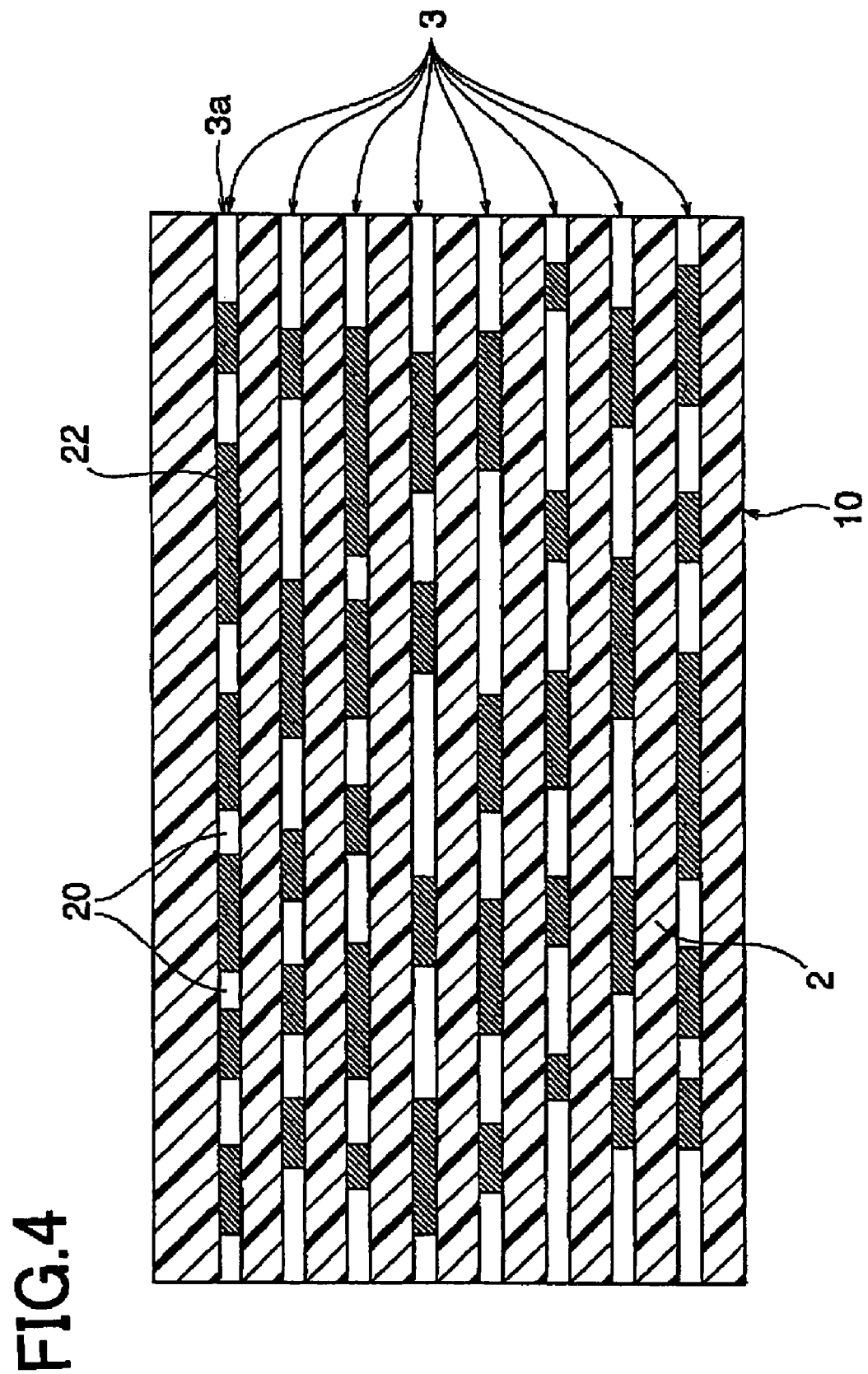
FIG. 4 is a schematic view of key parts for explaining electrode breaking.

An electrode coverage rate of an internal electrode was obtained by cutting a multilayer ceramic capacitor sample so that the electrode surface was exposed, performing SEM observation on the electrode surface and performing image processing on a metallographic microscope image of the polished surface. When cutting on a surface being parallel with the stacking direction, each of the internal electrodes is observed in a linear shape, and holes on the electrode surface are observed as electrode breakings 20 as shown in FIG. 4. On the outermost layer electrode surface 3a shown in FIG. 4, a total length of an electrode linear part 22 was measured excepting the electrode breakings 20 in a scope length, and a rate of the total length of the electrode linear parts 22 to the scope length was used as the electrode coverage rate (%). Specifically, a total length of the electrode linear parts 22 (that is, a length excepting the breaking parts 20 from the scope length) was obtained and a rate of the total length of the electrode linear amount 22 to the scope length was calculated to obtain the electrode coverage rate. Note that the electrode coverage rate was obtained by using five metallographic microscope images and measuring a scope length of 100 μm. The results of the outermost layer coverage rates are shown in Table 1.

Humidity Resistance Test

Capacitor samples were placed in an atmosphere with a temperature of 85° C. and relative humidity of 80%, a voltage of 50V was applied to the capacitor samples and time until the resistance falls by one digit was measured. The longer the time is, the more excellent in humidity resistance. In the humidity resistance test, 1500 hours or longer were evaluated "o" and those shorter than that were evaluated "x". The results of the humidity resistance test are shown in Table 1.

TABLE 1

| | | From Outermost Layer | Co-material Adding Quantity (wt %) | Outermost Layer Electrode Coverage Rate (%) | Humidity Resistance Test (h) | Humidity Resistance Evaluation | Temperature Characteristics @150° C. | Temperature Characteristics Evaluation |
|---|---|---|---|---|---|---|---|---|
| Example 1 | U1 | 1-30 layers | 40 | 95 | >2000 | ○ | −12.1 | ○ |
| | U2 | 31-60 layers | 30 | 93 | | | | |
| | U3 | 61-90 layers | 20 | 90 | | | | |

TABLE 1-continued

|  |  | From Outermost Layer | Co-material Adding Quantity (wt %) | Outermost Layer Electrode Coverage Rate (%) | Humidity Resistance Test (h) | Humidity Resistance Evaluation | Temperature Characteristics @150° C. | Temperature Characteristics Evaluation |
|---|---|---|---|---|---|---|---|---|
| Example 2 | U1 | 1-30 layers | 50 | 96 | >2200 | ◯ | −12.9 | ◯ |
|  | U2 | 31-60 layers | 30 | 92 |  |  |  |  |
|  | U3 | 61-90 layers | 20 | 89 |  |  |  |  |
| Example 3 | U1 | 1-30 layers | 60 | 97 | >2100 | ◯ | −13.5 | ◯ |
|  | U2 | 31-60 layers | 30 | 93 |  |  |  |  |
|  | U3 | 61-90 layers | 20 | 90 |  |  |  |  |

Note 1:
The qualifying standard of Humidity Resistance Test was 1500 hours or longer.
Note 2:
The results having Δ C/C within ±15% were evaluated "◯".

EXAMPLE 2

Other than changing the adding quantity of the co-material to the Ni particles to 50 wt % then producing the internal electrode paste to be used for internal electrode layers in the pre-multilayer body unit $U_1$, samples were produced in the same way as in the example 1 and the same evaluations were made. The results are shown in Table 1.

EXAMPLE 3

Other than changing the adding quantity of the co-material to the Ni particles to 60 wt % when producing the internal electrode paste to be used for internal electrode layers in the pre-multilayer body unit $U_1$, samples were produced in the same way as in the example 1 and the same evaluations were made. The results are shown in Table 1.

Comparative Example 1

Other than changing the adding quantity of the co-material to the Ni particles to 20 wt % when producing all internal electrode paste to be used for internal electrode layers in the pre-multilayer body units $U_1$, $U_2$ and $U_3$, samples were produced in the same way as in the example 1 and the same evaluations were made. The results are shown in Table 2.

Comparative Example 2 other than changing the adding quantity of the co-material to the Ni particles to 50 wt % when producing all internal electrode paste to be used for internal electrode layers in the pre-multilayer body units $U_1$, $U_2$ and $U_3$, samples were produced in the same way as in the example 1 and the same evaluations were made. The results are shown in Table 2.

Evaluation

In the example 1 to 3, capacitors, wherein the co-material adding quantity of the outermost layers is larger than that in the center layers, exhibited high outermost electrode coverage rates and satisfied qualifying standard in the humidity resistance test and temperature characteristics. On the other hand, in the case of capacitors, wherein the co-material adding quantity of the outermost layers was same as that in the center layers, when the co-material adding quantity is small, the outermost layer electrode coverage rate was low and the standard of the humidity resistance test was not satisfied (the comparative example 1). When the co-material adding quantity was too large, the standard of the temperature characteristic test was not satisfied (the comparative example 2).

TABLE 2

|  |  | From Outermost Layer | Co-material Adding Quantity (wt %) | Outermost Layer Electrode Coverage Rate (%) | Humidity Resistance Test (h) | Humidity Resistance Evaluation | Temperature Characteristics @150° C. | Temperature Characteristics Evaluation |
|---|---|---|---|---|---|---|---|---|
| Comparative Example 1 | U1 | 1-30 layers | 20 | 40 | 980 | X | −11.1 | ◯ |
|  | U2 | 31-60 layers | 20 | 59 |  |  |  |  |
|  | U3 | 61-90 layers | 20 | 65 |  |  |  |  |
| Comparative Example 2 | U1 | 1-30 layers | 50 | 97 | >2000 | ◯ | −15.5 | X |
|  | U2 | 31-60 layers | 50 | 97 |  |  |  |  |
|  | U3 | 61-90 layers | 50 | 97 |  |  |  |  |

Note 1:
The qualifying standard of Humidity Resistance Test was 1500 hours or longer.
Note 2:
The results having Δ C/C within ±15% were evaluated "◯".

Reference Example 1

Other than changing a weight ratio of $BaTiO_3$ particles to the Ni particles and changing the co-material quantity to 65 wt % when producing internal electrode paste to be used for internal electrode layers of the pre-multilayer body units $U_1$, the same attempts as those in the example 1 were made to produce samples, however, internal electrode paste could not be produced because a paste form was not obtained.

What is claimed is:

1. A production method of a multilayer electronic device configured that dielectric layers formed by using dielectric paste and internal electrode layers formed by using conductive paste are alternately stacked:
   wherein
   when adding conductive particles and co-material particles to said conductive paste,
   an adding quantity of the co-material included in said conductive paste for forming said internal electrode layers at the outermost positions in the stacking direction is larger than an adding quantity of the co-material included in said conductive paste for forming said internal electrode layers positioned at the center in the stacking direction.

2. The production method of a multilayer electronic device as set forth in claim 1, wherein an adding quantity of the co-material included in said conductive paste for forming each of internal electrode layers gradually increases from said internal electrode layers positioned at the center in the stacking direction to said internal electrode layers positioned at the outermost positions in the stacking direction.

3. The production method of a multilayer electronic device as set forth in claim 2, wherein an adding quantity of the co-material included in said conductive paste for forming said internal electrode layers at the outmost positions in the stacking direction is larger than 30 wt % and smaller than 65 wt % with respect to 10 parts by weight of said conductive particles.

4. The multilayer electronic device as set forth in claim 3, wherein assuming that a particle diameter of conductive particles included in conductive paste for forming internal electrode layers at the outermost positions in the stacking direction is $\alpha$ and a particle diameter of co-material particles is $\beta$, $\alpha/\beta$ is 0.8 to 8.0.

5. A multilayer electronic device produced by the production method as set forth in claim 2, wherein
   when assuming that the total number of stacking layers of said internal electrode layers is N,
   adding quantities of the co-material included in said conductive paste for forming all of the internal electrode layers within the range of (1 to 0.2×N) layers form the outermost internal electrode layer in the stacking direction are larger than 30 wt % and smaller than 65 wt % with respect to 100 parts by weight of said conductive particles.

6. The production method of a multilayer electronic device as set forth in claim 1, further comprising a step of stacking pre-multilayer body units formed by stacking a plurality of said internal electrode layers and said dielectric layers:
   wherein an adding quantity of the co-material included in conductive past for forming said internal electrode layers included in said pre-multilayer body units at the outermost positions in the stacking direction is larger than an adding quantity of the co-material included in conductive paste for forming said internal electrode layers included in said pre-multilayer body units positioned at the center in the stacking direction.

7. The production method of a multilayer electronic device as set forth in claim 6, wherein an adding quantity of the co-material included in said conductive paste for forming said internal electrode layers at the outmost positions in the stacking direction is larger than 30 wt % and smaller than 65 wt % with respect to 10 parts by weight of said conductive particles.

8. The multilayer electronic device as set forth in claim 7, wherein assuming that a particle diameter of conductive particles included in conductive paste for forming internal electrode layers at the outermost positions in the stacking direction is $\alpha$ and a particle diameter of co-material particles is $\beta$, $\alpha/\beta$ is 0.8 to 8.0.

9. A multilayer electronic device produced by the production method as set forth in claim 6, wherein
   when assuming that the total number of stacking layers of said internal electrode layers is N,
   adding quantities of the co-material included in said conductive paste for forming all of the internal electrode layers within the range of (1 to 0.2×N) layers form the outermost internal electrode layer in the stacking direction are larger than 30 wt % and smaller than 65 wt % with respect to 100 parts by weight of said conductive particles.

10. The production of a multilayer electronic device as set forth in claim 6, wherein an adding quantity of the co-material included in said conductive paste for forming said internal electrode layers gradually increases discretely by each of pre-multilayer body units from said pre-multilayer body units positioned at the center in the stacking direction to said pre-multilayer body unit at the outermost positions in the stacking direction.

11. The production method of a multilayer electronic device as set forth in claim 10, wherein an adding quantity of the co-material included in said conductive paste for forming said internal electrode layers at the outmost positions in the stacking direction is larger than 30 wt % and smaller than 65 wt % with respect to 10 parts by weight of said conductive particles.

12. The multilayer electronic device as set forth in claim 11, wherein assuming that a particle diameter of conductive particles included in conductive paste for forming internal electrode layers at the outermost positions in the stacking direction is $\alpha$ and a particle diameter of co-material particles is $\beta$, $\alpha/\beta$ is 0.8 to 8.0.

13. A multilayer electronic device produced by the production method as set forth in claim 10, wherein
   when assuming that the total number of stacking layers of said internal electrode layers is N,
   adding quantities of the co-material included in said conductive paste for forming all of the internal electrode layers within the range of (1 to 0.2×N) layers form the outermost internal electrode layer in the stacking direction are larger than 30 wt % and smaller than 65 wt % with respect to 100 parts by weight of said conductive particles.

14. The production method of a multilayer electronic device as set forth in claim 1, wherein an adding quantity of the co-material included in said conductive paste for forming said internal electrode layers at the outmost positions in the stacking direction is larger than 30 wt % and smaller than 65 wt % with respect to 10 parts by weight of said conductive particles.

15. The multilayer electronic device as set forth in claim 14, wherein assuming that a particle diameter of conductive particles included in conductive paste for forming internal electrode layers at the outermost positions in the stacking direction is $\alpha$ and a particle diameter of co-material particles is $\beta$, $\alpha/\beta$ is 0.8 to 8.0.

16. A multilayer electronic device produced by the production method as set forth in claim 1, wherein when assuming that the total number of stacking layers of said internal electrode layers is N, adding quantities of the co-material included in said conductive paste for forming all of the internal electrode layers within the range of (1 to 0.2×N) layers form the outermost internal electrode layer in the stacking direction are larger than 30 wt % and smaller than 65 wt % with respect to 100 parts by weight of said conductive particles.

17. The multilayer electronic device as set forth in claim 16, wherein when assuming that a particle diameter of conductive particles included in conductive paste for forming said internal electrode layers at the outermost positions in the stacking direction is $\alpha$ and a particle diameter of co-material particles is $\beta$, $\alpha/\beta$ is 0.8 to 8.0.

18. The multilayer electronic device as set forth in claim 1, wherein an adding quantity of the co-material included in conductive paste for forming said internal electrode layers at the center position in the stacking direction is 10 to 25 wt % with respect to 100 parts by weight of conductive particles.

19. The multilayer electronic device as set forth in claim 1, wherein exterior dielectric layers are stacking outside of said internal electrode layers at the outermost positions in the stacking direction.

20. A multilayer electronic device produced by the production method of a multilayer electronic device as set forth in claim 1.

\* \* \* \* \*